United States Patent

Russell

[11] 4,198,920
[45] Apr. 22, 1980

[54] ENERGY CONSERVATION INDICATOR

[76] Inventor: William F. Russell, 2575 Victor Ave., #647, Glenview, Ill. 60025

[21] Appl. No.: 744,285

[22] Filed: Nov. 22, 1976

[51] Int. Cl.² .............................................. G01K 11/16
[52] U.S. Cl. ...................................... 116/202; 73/356; 116/216
[58] Field of Search ........ 116/114.5, 114 V, 114 AM; 73/356; 350/160 LC; 23/230 LC

[56] References Cited

U.S. PATENT DOCUMENTS

| | | | |
|---|---|---|---|
| 2,308,087 | 1/1943 | Lappala | 116/114 V |
| 3,117,442 | 1/1964 | Brooks | 116/114 V |
| 3,861,213 | 1/1975 | Parker | 73/356 |

Primary Examiner—Gerald Goldberg
Assistant Examiner—Denis E. Corr
Attorney, Agent, or Firm—Harry G. Mansen

[57] ABSTRACT

An energy conservation indicator for use in an enclosed locality adapted to be heated and/or cooled to temperatures maintained within limits recommended for energy conservation purposes comprises a thin disc of transparent material, having a backing provided with contrastingly colored printed matter and images of parts of a human face, such as eyes and eyebrows. A first configuration of encapsulated liquid temperature-sensitive crystals is arranged between the disc and the backing below the eyes to represent the image of a mouth on the face. The liquid crystals are of such a nature as to reflect incident white light through the disc at temperatures between a recommended upper temperature for heating and a recommended lower temperature for cooling, and said first configuration of the crystals constitutes an upwardly arced curve which, when activated, imparts to the face a frowning countenance to thereby indicate to an observer that the temperature in the locality is not within the recommended limits.

The indicator may include a second configuration of encapsulated liquid crystals between the disc and the backing, arranged and adapted, when activated, to impart to the face an image of a smiling countenance.

2 Claims, 5 Drawing Figures

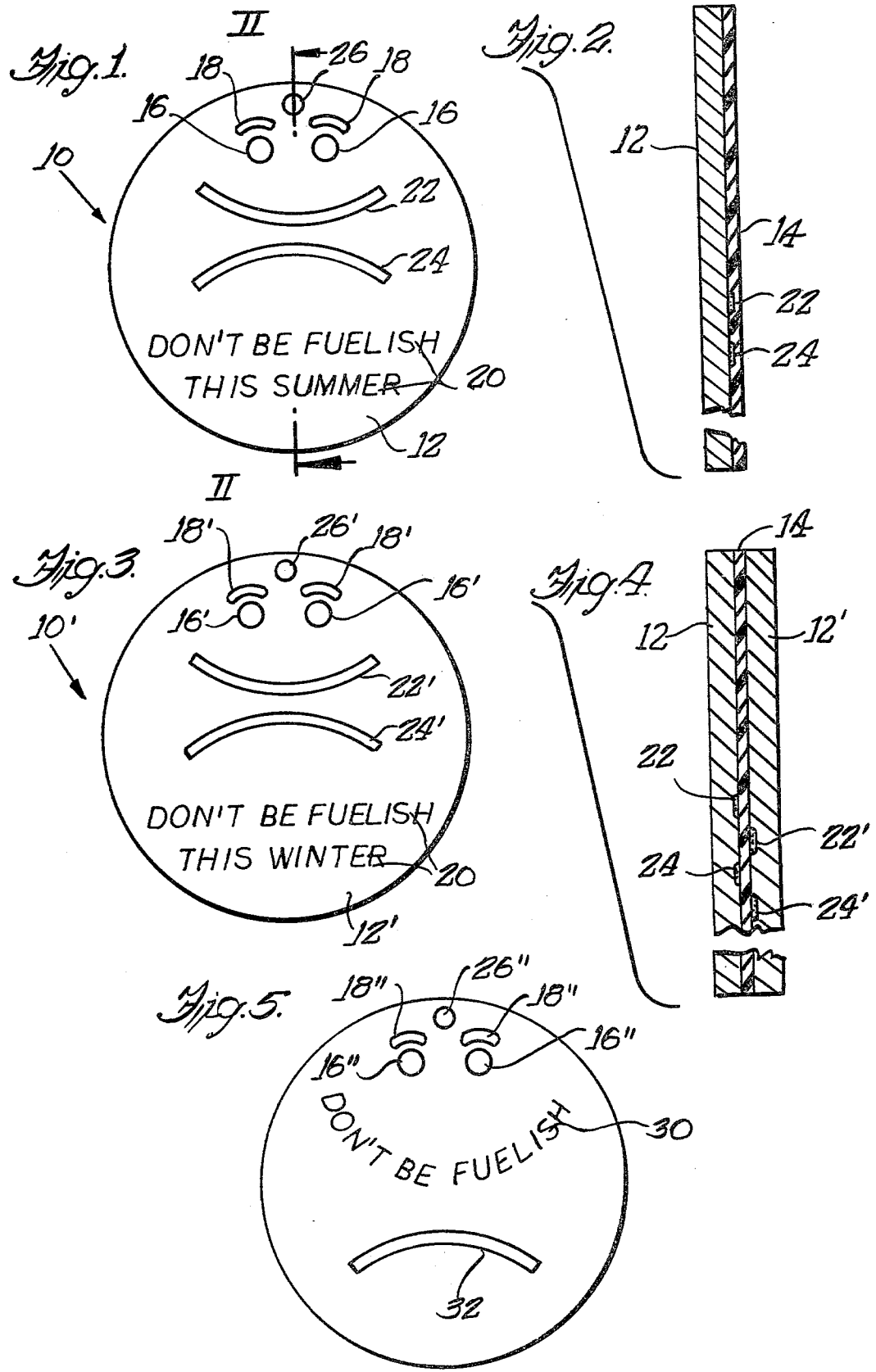

ENERGY CONSERVATION INDICATOR

The invention relates to an indicator adapted to show at a glance, even at a considerable distance, and in relative darkness, whether the ambient temperature is within the limits established by the Federal Energy Administration (FEA) in the interest of fuel and electricity conservation.

According to FEA regulations at present in force, an enclosed locality, such as a residence, an apartment, a restaurant, a meeting hall, etc., should in the interest of energy conservation not be heated in winter-time to a temperature above 68° F. and not be cooled ((air conditioned) in the summer-time to a temperature below 78° F. Compliance and noncompliance with these rules can, of course, be determined through the use in the locality in question of a thermometer, and regulation of the heating or cooling plant to accomplish any changes required according to the temperatures indication may then be performed either manually or automatically by means of a thermostat. The present invention is not contemplated to alter any of such general arrangements, which may well remain unchanged.

The present invention is based on the utilization of thermally sensitive compounds in the form of encapsulated liquid crystals which are now commercially available in various embodiments, such as tiny packages varying in diameter from 2 to 50 microns. Such crystals may be combined to form various configurations, such as squares, diamonds, lines of varying shape and width, etc. The crystals in a given system are colorless and transparent when illuminated with white light at most temperatures. However, within certain selectable ranges of temperature the crystals respond to changes in temperature by sequentially passing through the complete visual spectrum (red through violet). Since the colors thus scattered by the liquid crystals represent only a fraction of the incident light and the remaining portion thereof is transmitted through the crystals, an absorptive dark background is needed to prevent reflection of the lastmentioned portion of the transmitted light in order to enhance the purity of resolution of the scattered colors or wavelengths reflected by the liquid crystal system.

The properties of liquid crystals briefly outlined above are well known in the field today and have been utilized in various products, such as digital thermometers, "mood" rings, "mood" stones, and the like. Embodiments of the present invention are described in detail below with reference to the accompanying drawing, in which FIG. 1 is a front elevational view of an embodiment of the invention, FIG. 2 shows a vertical transverse section along line II—II in FIG. 1 on an enlarged scale, FIG. 3 is a front elevational view of a slightly modified embodiment of the invention, FIG. 4 shows, on an enlarged scale, a vertical transverse section, similar to FIG. 2, of an embodiment of the invention, in which the indicator of FIG. 1 is mounted back-to-back with the indicator of FIG. 3, and FIG. 5 is a front elevational view of a further embodiment of the invention.

The energy conservation indicator shown in FIGS. 1 and 2 comprises a flat circular disc 10 which is composed of two thin layers 12, 14. The layer 12 is made of a colorless transparent material, perferably a polyester composition of the kind known as "mylar". The layer 14 may be a very thin sheet of photographic film, colored paper or similar material. Alternatively, it may consist of a colored material sprayed on layer 12. For reasons which will become apparent as this description proceeds, the color of layer 14 is preferably a shade of dark blue, and it is provided on its front side, i.e. the side facing layer 12, with pictorial and/or printed matter, in the embodiment shown consisting of a couple of eyes 16 with eyebrows 18 in the top portion of the disc 10 and one or more printed lines of writing 20 in the lower portion of disc 10. This pictorial and printed matter 16, 18, 20 is preferably of a turquoise or light blue color, so that it shows through the transparent layer 12 in clear contrast to the darker background color of the backing layer 14.

The printed matter 20 may comprise a slogan, such as "Don't be Fuelish this Summer", in which case the smile line 22 consists of crystals which are activated (clearly visible) at temperatures above 78° F., to display a smiling face, and when the cooling proceeds to below said temperature, line 22 becomes invisible, while the crystals in line 24 become activated (clearly visible) to display a frowning face, thus indicating that the cooling rate is excessive or, in other words, that "fuel" (electricity is being wasted.

On the other hand, the printed matter 20 may comprise a slogan, such as "Don't be Fuelish this Winter" (see FIG. 3). In this case the "smile" line 22' consists of crystals which are activated (visible) at temperatures below 68° F., and when the heating proceeds to above said temperature, said "smile" line 22' becomes invisible, while the crystals in line 24' become activated (visible) to display a frowning face, thus indicating that the heating rate exceeds that recommended by the FEA, so that fuel is being wasted. Expect for the exact wording of the slogans 24, 24' and the selected temperature-sensitivity of the crystals in lines 22 and 22' the two versions of the indicator described above may be exactly alike, and they are of course intended for use alternatingly, one (FIG. 1) during the cooling season and the other (FIG. 3) during the heating season. The indicator has a hole 26,26',26" therethrough for suspension on a wall pin.

It is noted that in both cases the crystals in the "frown" line 24, 24' are identical, in that their temperature-sensitivity is such as to cause activation (visibility) in the range between 68° F. and 78° F. The two indicators 10, 10' may be entirely separate, or they may be attached to each other back to back, as indicated in FIG. 4, in which case only one backing layer 14 is required, the crystal rows 22, 22' and 24, 24', respectively, in this case being disposed at different levels so as not unnecessarily add to the thickness of the composite indicator, even though the thickness of the crystals obviously is infinitely small.

A further embodiment of the invention is shown in FIG. 5, in which the printed matter on the backing member comprises the two eyes 18" and the phrase "Don't be Fuelish", as at 30. The printed matter 30 extends along a downwardly curving arc to give the "face" a smiling expression. The liquid crystals are arranged in a line 32 arcing upwardly to simulate a frown and disposed below the printed matter 30. The crystals in this frown line 32 are selected so as to become activated in the temperature range 68°-78° F. The printed matter 30 may, of course, be placed below the frown line 32, if desired.

Accordingly, at all temperatures except between 68° F. and 78° F. the disc displays a "face" which due to the curvature of the printed matter 30 gives a smiling, i.e. approving, impression. When the ambient temperature is below 68° F. and the heating plant is in operation, the temperature rises until, at 68° F., the frown line 32 becomes active, thus indicating that the ambient temperature is higher than the recommended maximum. Conversely, when the cooling plant is in operation and the ambient temperature thus decreasing, the frown line 32 becomes activated at the recommended lower cooling limit of 78° F. It is to be noted, that in this embodiment the printed matter 32 preferably deviates in color from that of the backing material to a much smaller degree than do the activated crystals in the frown line 32, so that when the frown line is developed, the frowning countenance of the face is clearly dominating. For example, if the backing member color is dark blue, the printed matter 30 (and the eyes 18") may be a shade of lighter blue. Thus, when the frown line 32 is activated, its bright colors of the spectrum will overcome the smiling image of the printed matter, and this is, of course, particularly true when the disc is viewed from a distance which is practically always the case in ordinary use.

The invention is not limited to the embodiments described above and shown in the drawing. On the contrary, various modifications thereof are feasible within the framework of the appended claims. For example, encapsulated temperature-sensitive liquid crystals are now available of such a variety of optical and physical properties as to render it possible to vary the temperature ranges exemplified above within considerable limits for compliance with varying official or self-imposed requirements.

What I claim is:

1. An energy conservation indicator for use in an enclosed locality adapted to be heated and/or cooled to temperatures bounded by limits recommended for energy conservation purposes, comprising a pair of thin discs of transparent material having a backing of dark color provided with contrastingly colored printed matter and images of parts of a human face, such as eyes and eyebrows;
   a. each of said discs having between itself and its backing a first and a second configuration or encapsulated liquid temperature-sensitive crystals representing separate mouths on the face and forming a downwardly arced curve and an upwardly arced curve, respectively;
   b. the crystals in said first configuration on one disc being of such a nature as to reflect incident white light and thereby give a smiling countenance to the face at temperatures below the recommended upper temperature for heating;
   c. the crystals in said second configuration on said one disc being of such a nature as to reflect incident white light and thereby give a frowning countenance to the face at temperatures above the recommended upper temperature for heating;
   d. the crystals in said first configuration on the other disc being of such a nature as to reflect incident white light and thereby giving a smiling countenance to the face at temperatures above the recommended lower temperature for cooling; and
   e. the crystals in said second configuration on said other disc being of such a nature as to reflect incident white light and thereby give a frowning countenance to the face at temperatures below the recommended lower temperature for cooling;
   f. said two discs being joined back to back, whereby the unit thus formed may be used during the heating season (winter) as well as during the cooling season (summer) by suspending the unit to expose one side or the other to view.

2. The energy conservation indicator as set forth in claim 1, wherein the backing for the two discs is one and the same.

* * * * *